UNITED STATES PATENT OFFICE.

CARL BARTELS, OF BOSTON, MASSACHUSETTS.

PRESERVATIVE COATING FOR MEATS.

SPECIFICATION forming part of Letters Patent No. 318,851, dated May 26, 1885.

Application filed April 3, 1885. (No specimens.)

*To all whom it may concern:*

Be it known that I, CARL BARTELS, of Boston, county of Suffolk, and State of Massachusetts, have invented an Improvement in Preservatives for Meats, of which the following description is a specification.

This invention has for its object to preserve meats from decomposition or decay for a reasonable period of time; and it consists in applying to the exterior of the meat, by means of a brush or other suitable implement, one or more coatings of a gummy or resinous preserving compound. The meat is preferably sufficiently dried to expel the moisture therefrom, and the preservative compound is then applied, the nature of the materials employed to form the compound being such as to readily dry and form a thin tenacious film or coating which is impervious to the atmosphere.

The nature of my invention and manner of compounding and applying the same is fully disclosed in the following description: Take from four to eight ounces of isinglass or gum, such as gum tragacanth, dissolved in water, and mix with it the resulting product obtained from the following mixture, viz: Take one ounce each of galangal, cubebs, aloes, angelica-root, and masterwort, or equivalent substances of an aromatic nature, and to impart flavor and perfume preferably add frankincense, cinnamon, clove, and nutmeg. Grind the same and agitate with about one quart of alcohol or water, or both, as desired. Distill or filter the mixture to free it from the residuum or solid matter. To this mixture I then add one ounce of resin, preferably mastic, previously dissolved in alcohol; and, lastly, when the mixture thus formed is in a warm state, I add from two to three pounds of Venice turpentine, also heated to about the same temperature, thus forming a gummy or resinous compound which will readily become dry by evaporation.

To apply the preservative compound above described to meats, I first dry the same sufficiently to remove all superfluous moisture. Then apply a coating of the compound, and allow the same to dry for two hours or thereabout, after which succeeding coatings may be applied, if deemed necessary. The nature of the materials employed is such that a thin tenacious film is formed impervious to the air, thus fully protecting the meat from decomposition, and also being of an aromatic nature tends to preserve the sweetness and natural taste of the meat. It is obvious that the same result may be obtained by first coating the meat with the resulting product obtained from the distillation or percolation of the aromatic substances, and then applying a succeeding coating of the gummy or resinous compound, consisting of isinglass and resin dissolved as above stated, and Venice turpentine being added while in a warm state. When distillation is preferred, the aromatic substances are agitated with alcohol; but when percolation is deemed best water, with or without alcohol, is employed instead.

While I preferably employ frankincense, cinnamon, clove, and nutmeg to impart a flavor and perfume, any other equivalent materials may be employed, or the same may be omitted entirely.

I claim—

1. A compound for preserving meats, &c., consisting of dissolved isinglass or gum, and an aromatic compound obtained from galangal, cubebs, aloes, angelica-root, and masterwort by distillation or filtration, dissolved resin and Venice turpentine, substantially in the proportions set forth.

2. A preservative for preserving meats, &c., consisting of an aromatic compound obtained from galangal, cubebs, aloes, angelica-root, and masterwort, by distillation or filtration, with a gummy or resinous addition consisting of isinglass or gum and resin dissolved and mixed with Venice turpentine, the said compound being applied to the meat successively, substantially and for the purposes set forth.

In testimony whereof I have signed my name to this specification in the presence of two subscribing witnesses.

CARL BARTELS.

Witnesses:
G. W. GREGORY,
B. J. NOYES.